(12) United States Patent
Maroti

(10) Patent No.: US 6,998,582 B1
(45) Date of Patent: Feb. 14, 2006

(54) COOKING APPARATUS

(75) Inventor: Steven Maroti, Fort Lee, NJ (US)

(73) Assignee: Hickory Industries, Inc., North Bergen, NJ (US)

( * ) Notice: Subject to any disclaimer, the term of this patent is extended or adjusted under 35 U.S.C. 154(b) by 0 days.

(21) Appl. No.: 11/079,558

(22) Filed: Mar. 14, 2005

(51) Int. Cl.
*H05B 3/68* (2006.01)

(52) U.S. Cl. .............................. 219/451.1; 219/451.11; 219/451.2; 219/453.1; 219/460.1; 219/462.1; 219/461.1; 99/341; 99/391; 99/399; 99/401; 99/423; 99/389

(58) Field of Classification Search ............ 219/451.1, 219/451.11, 451.12, 453.1, 460.1, 462.1, 219/461.1; 99/341, 391–2, 399, 401, 423, 99/389
See application file for complete search history.

(56) References Cited

U.S. PATENT DOCUMENTS

| | | | |
|---|---|---|---|
| 1,480,119 A | 1/1924 | Schey | |
| 1,665,225 A | 4/1928 | Simek | |
| 2,142,390 A | 1/1939 | Zerr | |
| 3,379,118 A | 4/1968 | Perez | |
| 3,405,422 A | 10/1968 | Sico et al. | |
| 4,305,329 A | 12/1981 | Fenoglio | |
| 4,411,920 A | 10/1983 | Fenoglio | |
| 4,516,485 A | 5/1985 | Miller | 99/339 |
| 4,660,467 A | 4/1987 | Waks | 99/339 |
| 5,533,440 A | 7/1996 | Sher | 99/421 |
| 5,586,486 A | 12/1996 | Nitschke et al. | 99/330 |
| 5,918,534 A | 7/1999 | Medina | |
| 5,974,956 A | 11/1999 | McConnell | 99/421 |
| 6,125,740 A | 10/2000 | Hedrington et al. | |
| 6,146,677 A | 11/2000 | Moreth | |
| 6,250,210 B1 * | 6/2001 | Moreth | 99/331 |
| 6,354,194 B1 * | 3/2002 | Hedrington et al. | 99/341 |
| 6,800,314 B1 | 10/2004 | Evans et al. | 426/233 |
| 2003/0196558 A1 | 10/2003 | Sands et al. | 99/357 |

* cited by examiner

*Primary Examiner*—Shawntina T. Fuqua
(74) *Attorney, Agent, or Firm*—Norris McLaughlin & Marcus PA

(57) ABSTRACT

An open-air cooking apparatus for cooking pizza and the like, includes a horizontal, rotatable, circular turntable cooking surface, sized to support and cook several items simultaneously. The turntable should preferably structured to provide constant, even heat throughout its surface. As the oven is open-air, the cooking of the items will be primarily conduction of heat from the surface of the turntable through the bottom of the item. As the items rotate, they will pass under a static radiant heat source located above the turntable. The radiant heat source will thus direct heat towards the top of the item only periodically, i.e. at one point per rotation. This allows the item, such as a pizza, to cook thoroughly from below by way of the cooking surface, while cooking and/or browning the top portion at a different, desired degree.

12 Claims, 5 Drawing Sheets

COOKING APPARATUS

BACKGROUND OF THE INVENTION

1. Field of the Invention

The present invention relates to a cooking apparatus for food, such as pizza. More particularly, the invention relates to an open-air cooking apparatus, having a heated rotating turntable surface for conduction heating from below and a radiant heat source for cooking from above.

2. Description of the Prior Art

Existing commercial pizza ovens are typically of the deck type, based on an enclosed static surface. A deck oven can make a good quality pizza, but the temperature is not easily controlled or changed, and the operator must manually move the pizzas about within the oven to make room for additional pizzas, and to achieve an evenly cooked pie. Other types of ovens for large-scale baking include a conveyor type oven, also enclosed. These ovens rely primarily on convection heating, as well as a degree of conduction heating from below. The drawback of these systems, particularly with respect to the cooking of pizza, is that it is difficult to control a temperature gradient within the oven, either spacially or temporally. As pizza requires a longer cooking time for the base or crust portion, compared to the upper topping layer, the result is often a pizza which is overcooked on top, or vice versa. Furthermore, the marketing of fresh-baked pizza suffers a disadvantage based on the hidden nature of the cooking process. The consumer only sees the end product, but can not see the pizza as it is being cooked. With a closed, convection type oven, this is difficult to achieve. Even if glass windows are provided, heat loss is experienced, and the view is limited and static, particularly if several pizzas are being cooked at once. These traditional ovens additionally suffer from a drawback in that they take a very long time, usually several hours, to reach the desired cooking temperature.

U.S. Pat. Nos. 4,305,329 and 4,411,920 to Fenoglio teach a gas-fired turntable oven for baking several pizzas at once. A closed cooking chamber is heated by gas-fired burners located beneath the rotating turntable. The chamber is heated, and the pizza is cooked, by convection. In addition, a radiant heating element 23 may be provided above the rotating pizza. This reference does not teach an open-air oven, and does not teach a turntable constructed as a chamber containing vaporizable fluid, which turntable provides a source of even, constant heat for cooking by way of conduction.

U.S. Pat. Nos. 6,125,740 and 6,354,194 to Hedrington et al teach an open-air apparatus for cooking a single pizza. Radiant heating elements are provided both above and below the rotating turntable, which turntable is simply a support surface for the pizza. The upper and lower radiant heating elements are pie-shaped (i.e. in the form of a pizza slice), so that heat can be evenly applied to a rotating round pizza. In other words, the heating surface increases in width from the center of the pizza toward the crust portion. This reference does not teach a rotating turntable for cooking several whole round pizzas at once, which turntable is constructed as a chamber containing vaporizable fluid for providing a source of even, constant heat for cooking by way of conduction. Nor does this reference teach a source for heating the turntable from beneath, as the turntable is constructed to allow the radiant heat to pass through to the pizza located on top of the turntable.

U.S. Pat. Nos. 6,250,210 and 6,146,677 to Moreth teach a closed oven housing for cooking several pizzas at once on a rotatable turntable. Cooking is achieved by a combination of convection heat, conduction heat and radiant heat. A heat source is in thermal communication with the bottom of the turntable, and increases in intensity from the center towards the outside perimeter to account for the increasing panel area. This acts to heat the turntable itself, which is constructed of heat retaining material, preferably of ceramic, and transmits heat by conduction to the pizza. In addition, heat flows up and around the edges of the turntable to provide convection heating to the interior of the cooking chamber. A radiant heat source applies intense heat downwardly onto the top surface of the pizza at a focused area.

While Moreth teaches a turntable in the form of a thermal reservoir, heated from below, and a radiant heating element above, relies additionally on the availability of convection heating, and therefore requires a closed cooking housing or chamber. The heat for convection flows from the heat source below the turntable, around a space provided between the outer edge of the turntable and the inside wall of the housing. In addition, Moreth teaches that the heating element below the turntable runs essentially the length of the radius of the turntable and has increasing intensity from the center point outwards; and that the turntable is solid ceramic.

It is therefore an object of the present invention to provide an apparatus for cooking pizza, or other foods which require differing cooking times and/or different cooking methods for the top and bottom portions.

It is a further object to provide an open-air cooking apparatus which provides a full view of the food product being cooked, from the beginning to the end of the cooking process, for several items simultaneously.

It is a still further object of the invention to provide a cooking apparatus relying solely on conduction and radiation heat, without the necessity for convection heating.

It is an additional object of the invention to provide a cooking apparatus having a rotatable turntable as a conduction heating element, which element may be evenly heated throughout by applying heat to any portion.

SUMMARY OF THE INVENTION

Accordingly, the present invention provides for a cooking apparatus comprising a horizontal, rotatable, circular turntable cooking surface, sized to support and cook several items simultaneously. The surface should be sized so that the items to be cooked should fit within the distance from the perimeter of the turntable to its center, so that several items, such as pizza pies, may be arranged about the center point in a circle. The turntable should preferably be structured to provide constant, even heat throughout its surface. As the oven is open-air, the cooking of the items will be primarily conduction of heat from the surface of the turntable through the bottom of the item. As the items rotate, they will pass under a static radiant heat source located above the turntable. The radiant heat source will thus direct heat towards the top of the item only periodically, i.e. at one point per rotation. This allows the item, such as a pizza, to cook thoroughly from below by way of the cooking surface, while cooking and/or browning the top portion at a different, desired degree. It will be seen that the cooking apparatus of the invention can rely on conduction heat and radiant heat, has the advantage of working in the absence of a dedicated convection heat source, or a closed housing for containing convection heat.

DETAILED DESCRIPTION OF THE INVENTION

A cooking surface 2 is provided, preferably in the form of a disk 4 or turntable mounted for rotation upon a base 6. The manner in which the disk is supported and caused to rotate may be fashioned according to the variations known to those skilled in the art. For example, the disk may be provided with a downwardly projecting axle, which axle is held and supported to allow rotational movement. Or, the disk may sit within a circumferentially conforming guide, so that it may rotate along its central axis being guidingly supported by rollers or bearings from beneath and/or circumferentially. In an exemplary embodiment, the disk is mounted on a pillow block bearing, holding the rotating shaft. The disk is also preferably supported by a Teflon® coated lip around the support surface.

Figure 5:
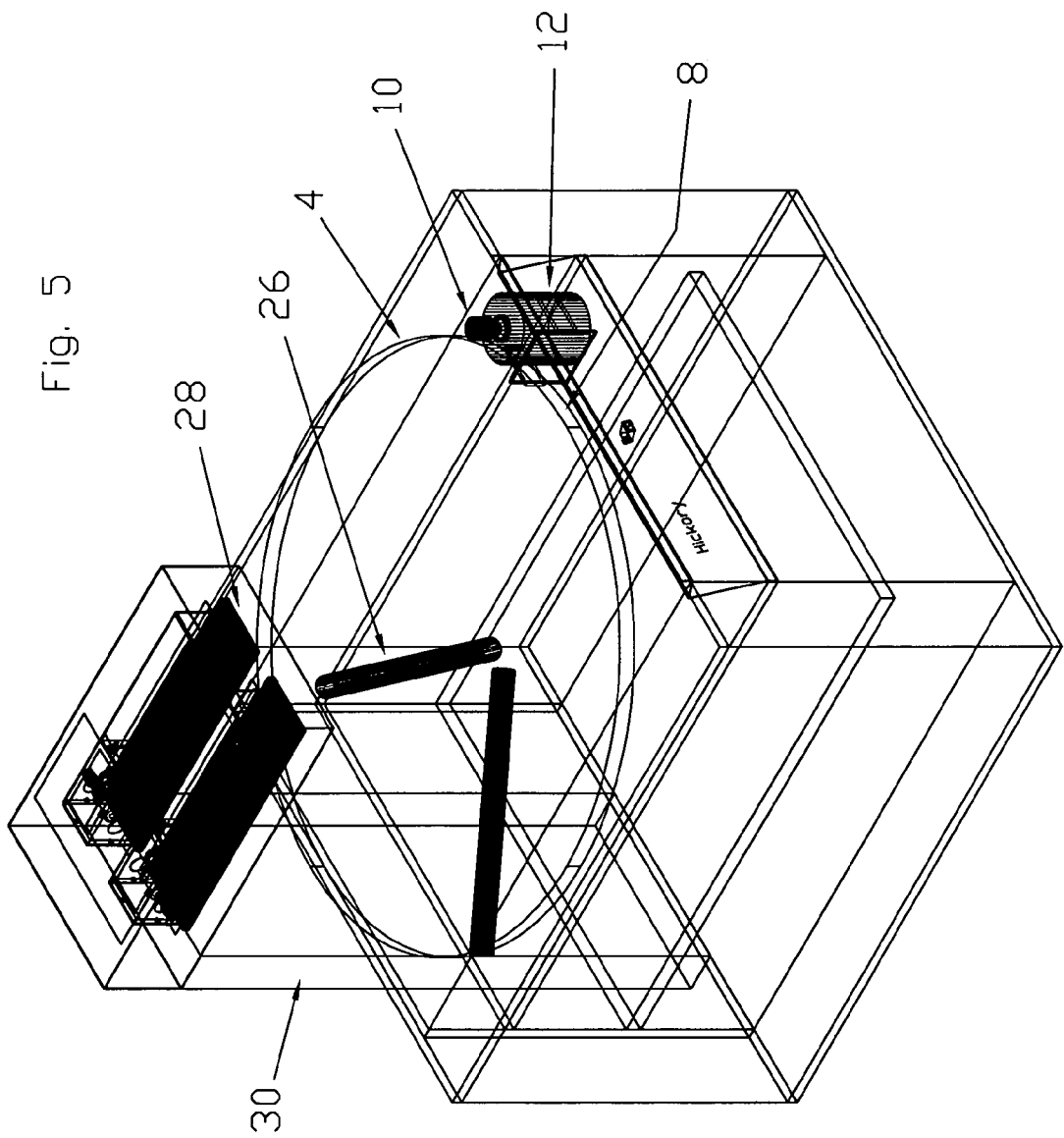
FIG. 5 is a perspective view showing internal elements.

The rotation of the disk 4 may be effected by any convenient means. The disk may be provided with gear teeth, either circumferentially oriented or axially projecting, which conform to a rotating gear powered by a motor. The disk may also be belt driven, for example by way of a belt about its circumference, or about an axle, or about a downwardly projecting integral disk of small circumference than the cooking surface disk, with the belt being driven by an appropriate driving means, such as a motor. Alternately, the axle may be driven directly the motor. In the exemplary embodiment, the disk 4 is driven by direct contact against its circumferential edge 8, or against its bottom surface towards the circumferential edge, by a rotating wheel 10, preferably driven directly by a motor 12, as shown in FIG. 5.

Figure 1:
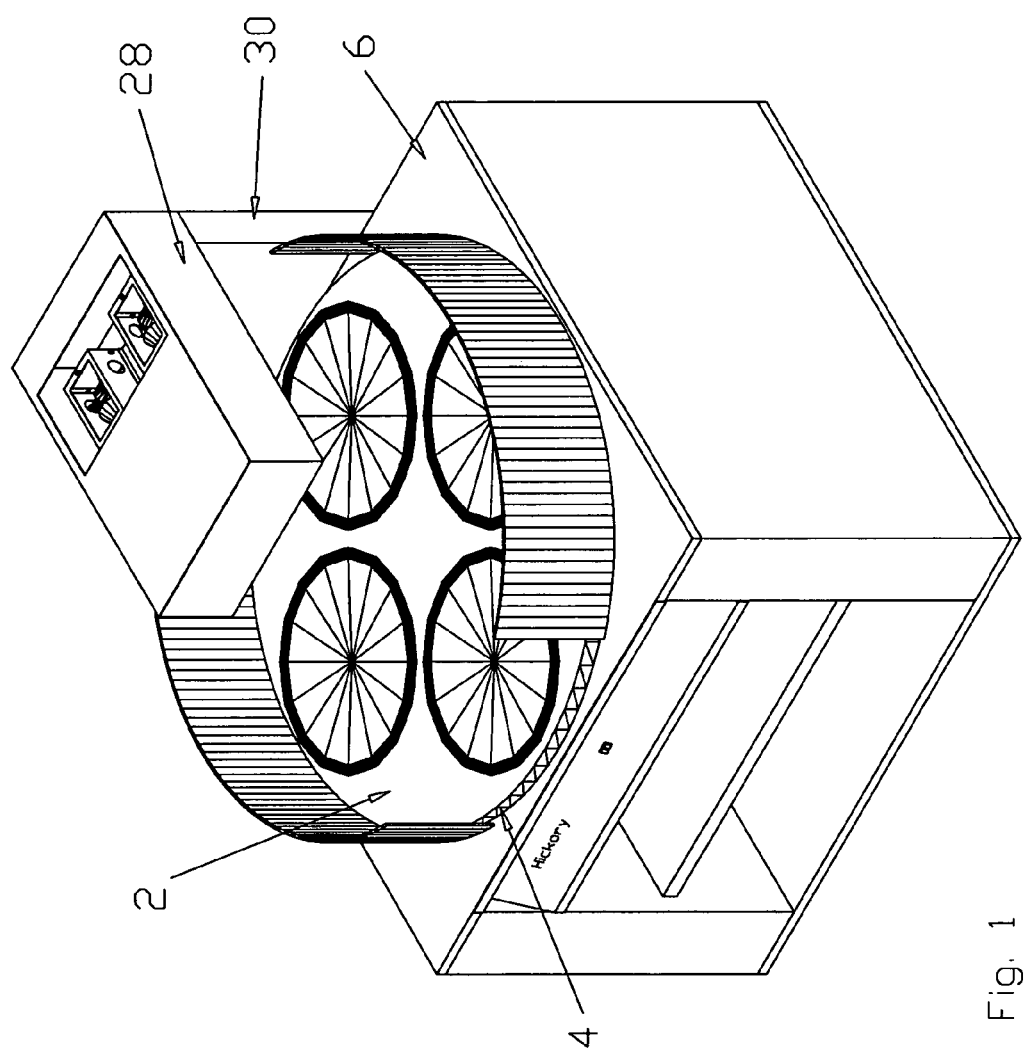
FIG. 1 is a perspective view of a preferred embodiment of the invention.
Figure 2:
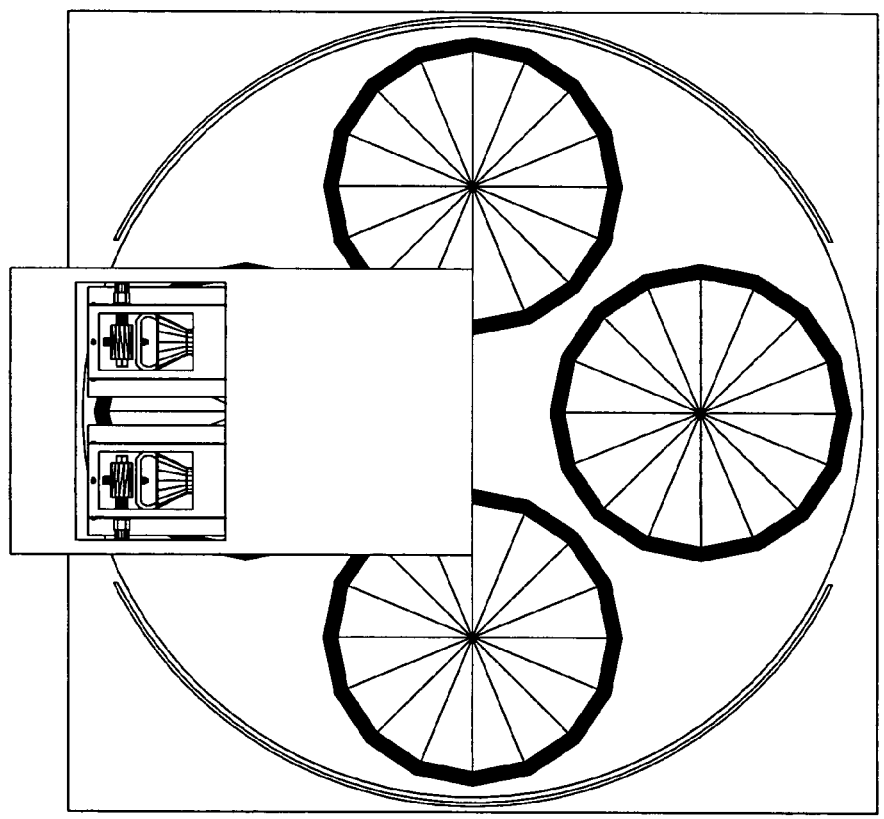
FIG. 2 is a top plan view.
Figure 3:
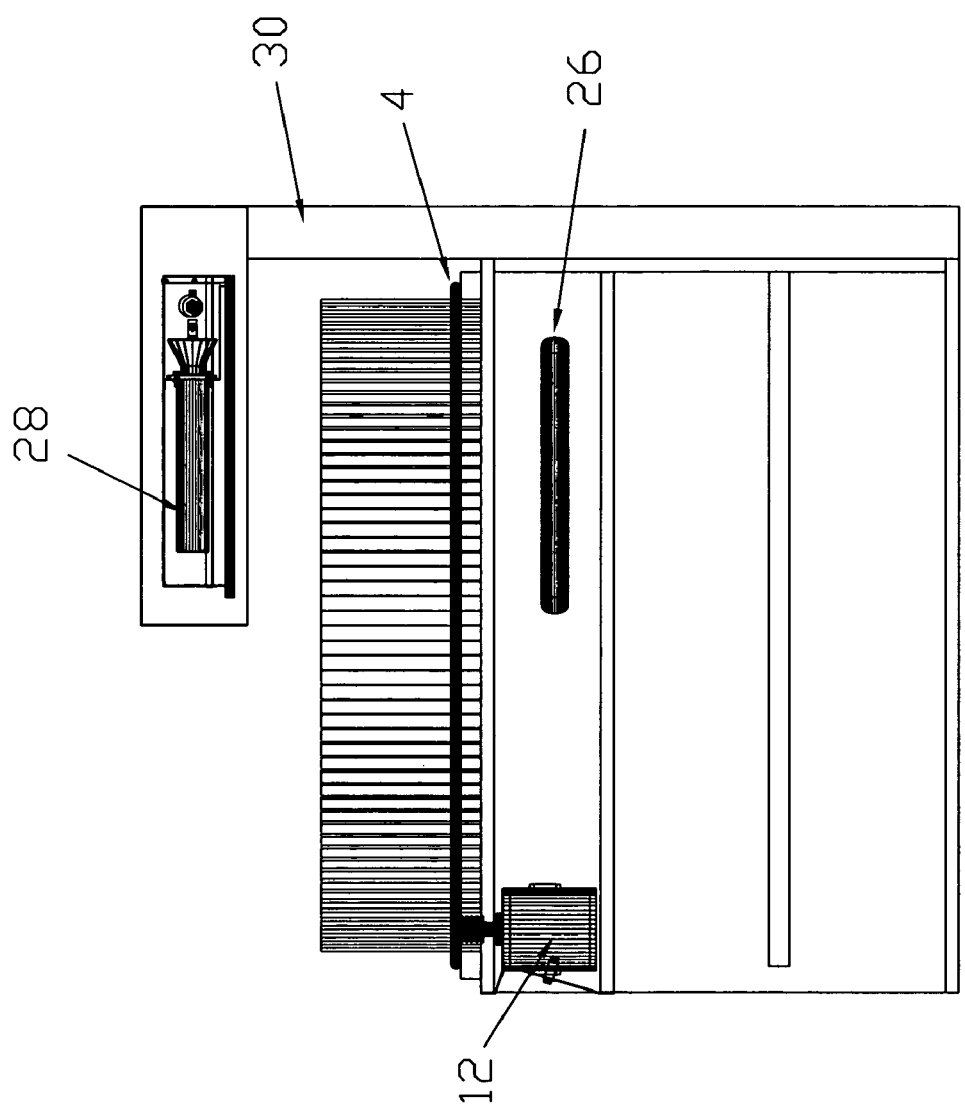
FIG. 3 is a side plan view of FIG. 1
Figure 4:
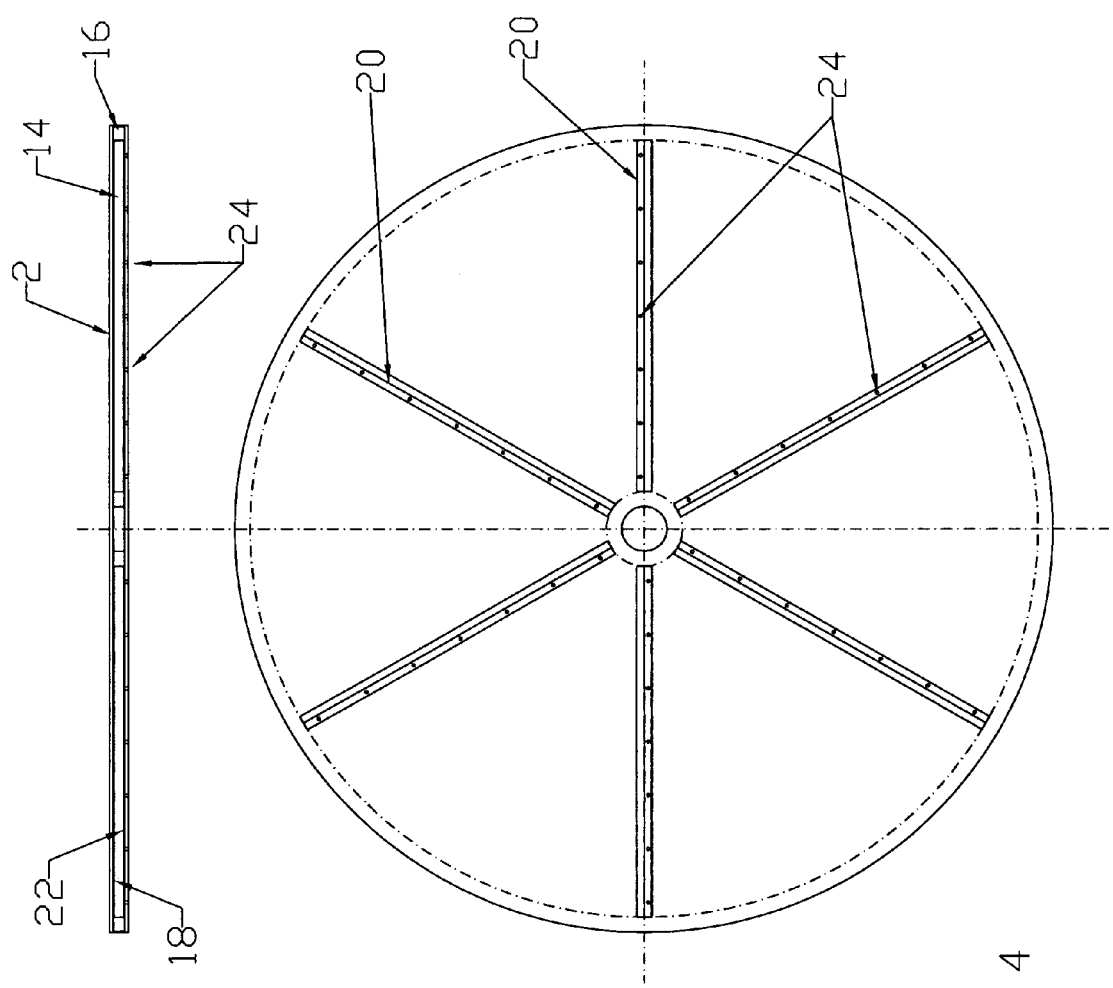
FIG. 4 is a top plan view of an embodiment of a cooking surface disk, showing also a cross-sectional view.

The cooking surface, and hence the disk itself, is preferably constructed so as to provide a surface which quickly reaches the desired cooking temperature, and which is structured to provide an evenly distributed, relatively constant temperature throughout its surface. In this regard, it is preferable to construct the disk based on a known technology involving a hollow, closed fluid tight system, wherein the system is filled with a liquid, such as Freon, which can be vaporized upon the application of heat applied externally. The inside space is filled with the fluid to a degree such that a volume is left over in which the fluid can vaporize. The fluid is able to flow freely throughout the system, so that an even heat distribution is achieved. Such a system is known with respect to longitudinal pins, as described in U.S. Pat. No. 3,379,118 and longitudinal spits having insulated handles, as described in U.S. Pat. No. 5,918,534. For the present invention, a novel structure is provided using the closed vaporizable fluid system, as shown in FIG. 4. An outer disk structure is provided in the form of a thin lateral slice of a cylinder. The inside 14 of the disk is generally hollow, forming a cylindrical inner volume generally conforming to the shape and dimension of the upper cooking surface 2, though of course slightly smaller diameter on account of the thickness of the circumferential wall 16. Thus, a fluid, such as Freon, is able to flow throughout and have contact with the upper wall 18 of the disk, providing heat directly and evenly by conduction to the cooking surface. To provide structural support, the disk may have a series of support walls or ribs 20 within the inner volume running from the top wall to the bottom wall. The ribs may be of any convenient arrangement which is sufficient to provide adequate structural support, while an arrangement having intersecting radial walls is shown in the drawing. It is important that the ribs be provided with a sufficient number of properly sized pass-through openings, to allow free flow of the fluid. Alternatively, the ribs can be positioned so that fluid may flow around free ends thereof, so that pores may not be necessary. The design of the ribs and the pass-through openings can be accomplished by those skilled in the art.

The material of the disk should be chosen as one which can handle high temperatures, allow for ease of cleaning, and which is preferably non-stick with respect to the food to be cooked. A preferred structure is a stainless steel structure, for example 7 gauge hot rolled, plated with aluminum, and coated with a high-heat Teflon® available from E.I. du Pont de Nemours and Co. The dimensions of the disk may be chosen according to the size of the cooking apparatus to be constructed. Some examples may be a disk with a radius of about 48 to 56 inches, which could hold about four 12 inch pizzas. An external thickness of such a disk may be about ¾ inch. Disks for smaller or larger operations could also be provided, and sized accordingly.

Within the open base structure, preferably beneath the disk, a source 26 is present for providing heat to the disk. A preferred method is one or more atmospheric burners, such as gas burners, infra-red source, electric generators, or calrods, directed heat at or against the bottom surface of the disk. The temperature of the disk may be monitored by way of an embedded thermocouple linked to a remote readout device. Because of the internal fluid-based structure, it is not necessary that the external heat be applied continuously to all locations on the disk. A burner or burners may be situated at any location with respect to the underside of the disk. The fluid within the disk will heat and vaporize, and flow within the disk to evenly distribute the heat. A food to be cooked, such as pizza, is placed directly on the cooking surface. The food is heated from beneath, and cooks throughout from the bottom up. Thus, a relatively flat, thin food such as pizza, or perhaps pie, is ideal.

Furthermore, in foods for which a top portion, in the case of pizza being cheese or other topping, could benefit from a shorter cooking time and/or a different cooking method, a second heat source is provided on the apparatus. In the case of pizza, the bottom, crust portion takes longer to cook than the cheese on top. In addition, the flavor and appearance of the cooked pizza is improved by cooking the cheese with radiant heat, which also may act to carmelize the cheese under controlled conditions. Therefore, a second cooking element 28 is provided, in this case a modulated infrared gas generator, such as model P741 available from Enerco Technical Products, Inc. of Cleveland, Ohio. The infrared element is suspended above the disk, for example by a supporting arm 30, and radiates heat downward towards the disk below. In a preferred embodiment, the infrared element is sized to roughly conform to, or be slightly smaller than, the radius of the disk, so that it can reside at a location between the center of the disk and its circumference. This allows the infrared heat to be applied to each food item, one at a time, as they pass beneath the element.

The height of the infrared element (which is preferably adjustable) from the cooking surface, as well as the degree and modulation of radiation, is best determined by the skilled person with respect to each sized apparatus, and for the particular food to be cooked. The atmospheric burners, disk rotation, infrared element height and modulation are all adjustable, and may be advantageously controlled by microprocessors, either according to input instructions, or via automatic feedback based on temperature probes or elements operating from within the apparatus, or even the food itself. In cases where different size of type of foods are being cooked simultaneously, the apparatus can be caused to adjust, such that, for example, the disk rotates at a faster, slower or even varying speed; or even periodically stops or reverses. Likewise, the infrared element may be programmed to adjust the heat intensity, or cycle on and off, to any degree. For example, the infrared heating may be applied only during the last portion of an overall cooking cycle, or may itself cycle on and off, or adjust, when a particular item passes underneath. Alternatively, the apparatus may be programmed to have the disk rotate faster as a certain food item passes underneath the radiant element, in order to 'skip' infrared heating.

In a larger apparatus, for example, one having a larger disk which is designed to handle two or more concentrically arranged rings of food to be cooked, the infrared element should be suitably designed to account for the different residence times under the element for the inner and outer rings of food. In such a case, separately programmable elements may be provided at various radial locations, or a single element may be provided which is shaped to provide equal intensity to all rings, taking into account the relative residence times.

A smaller apparatus is also possible, which is sized to hold, for example, a single pizza. In such a case, the cooking element may be static, with the infrared element modulating to cook the top of the pizza only for a limited time during the cooking cycle, or at a constant, but lower intensity. For a static cooking surface, the infrared element should be of similar coverage size, i.e. essentially conforming to the diameter of the disk, to cook the entire pizza. Or, if the cooking surface is a rotating disk, the infrared element may reside only between the center and circumferential edge of the disk, but be properly modulated to cook the top of the pizza (while only radiating a portion of the pizza at any one instant).

Since the cooking apparatus works by way of conductive and radiant heat, it is not necessary to have any enclosing walls to retain heat from convection cooking. Nevertheless, from a safety and food product protection perspective, it may be desirable to provide a lateral enclosure around the cooking surface. As one of the benefits of an open-air apparatus is that one can see what is being cooked, as it is being cooked, it is preferable to provide such an optional enclosure in the form of heat resistant glass.

While the apparatus has been described with respect to cooking of food, it should also be understood that general manufacturing of goods which require different resident heating times, and different heating approaches, may be prepared.

What is claimed is:

1. An open-air cooking apparatus, comprising:
a base,
a rotatable cooking surface element supported on the base, the cooking surface element being in the form of a hollow disk containing vaporizable fluid,
means for rotating the cooking surface element,
a heat source for directing heat towards at least a portion of the cooking surface element for heating said cooking surface element, and
a radiant heat source located above the cooking surface element for directing radiant heat towards the cooking surface element.

2. The apparatus of claim 1, wherein the heat source directs heat towards at least a portion of the bottom of the cooking surface element.

3. The apparatus of claim 1, wherein a hollow interior of the cooking surface element comprises at least one supporting rib connecting interior top and bottom walls of the cooking surface element.

4. The apparatus of claim 3, wherein the at least one supporting rib is a series of spokes radiating from the center of the cooking surface element.

5. The apparatus of claim 3, wherein the at least one rib has pass-through openings for allowing the fluid to flow throughout the interior of the cooking surface element.

6. The apparatus of claim 1, wherein cooking surface element is a conduction heat cooking source, the radiant heat source is a radiation heat cooking source, and wherein the apparatus is free of a dedicated means for providing convection cooking heat.

7. A cooking surface element comprising an upper wall having a flat cooking surface on an upper side thereof, a lower wall, and at least one lateral wall connecting the upper wall and lower wall, the upper, lower and lateral walls forming a hollow enclosed space containing a vaporizable fluid.

8. The element of claim 7, wherein the element is in the form of a disk and the at least one lateral wall is a circumferential wall.

9. The element of claim 7, wherein at least one rib supportingly connects the upper wall and lower wall.

10. The element of claim 9, wherein the at least one rib is constructed to allow free flow of the fluid therethrough or therearound.

11. The element of claim 10, wherein the rib has pass-through openings for allowing free flow of the fluid.

12. The element of claim 7, wherein the element is in the form of a disk and the at least one lateral wall is a circumferential wall, further comprising a plurality of ribs supportingly connecting the upper and lower wall, the ribs radiating outward from the center of the disk.

* * * * *